United States Patent [19]

House

[11] Patent Number: 5,490,470

[45] Date of Patent: Feb. 13, 1996

[54] TUBE ALIGNMENT SPACER BRACKET

[76] Inventor: John L. House, P.O. Box 552, Oak Grove, La. 71263

[21] Appl. No.: 348,361

[22] Filed: Nov. 30, 1994

Related U.S. Application Data

[63] Continuation-in-part of Ser. No. 150,723, Nov. 12, 1993, abandoned.

[51] Int. Cl.$^6$ ..................................................... A01C 15/00
[52] U.S. Cl. ............................... 111/186; 285/62; 111/80
[58] Field of Search .................................... 111/186, 170, 111/188, 80; 248/56, 65; 285/62

[56] References Cited

U.S. PATENT DOCUMENTS

| | | |
|---|---|---|
| 1,905,767 | 4/1933 | Traphagen . |
| 1,906,351 | 5/1933 | White . |
| 1,921,886 | 8/1933 | Kriegbaum . |
| 2,623,483 | 12/1952 | Stevenson . |
| 2,861,527 | 11/1958 | Phillips . |
| 2,903,982 | 9/1959 | Floy . |
| 2,968,266 | 1/1961 | Gustafson . |
| 2,990,186 | 6/1961 | Gandrud . |
| 3,120,965 | 2/1964 | MacDonald . |
| 3,399,638 | 9/1968 | Waldrum . |
| 3,888,446 | 6/1975 | O'Brien . |
| 3,891,332 | 6/1975 | Molyneux . |
| 4,276,836 | 7/1981 | Pust . |
| 4,388,878 | 6/1983 | Demzin . |
| 4,424,757 | 1/1984 | Gibbens . |
| 4,580,506 | 4/1986 | Fleischer . |
| 4,608,794 | 9/1986 | Delise . |
| 4,770,112 | 9/1988 | Neumeyer ............................... 111/186 |
| 5,025,736 | 6/1991 | Anderson . |
| 5,033,398 | 6/1991 | Froc . |
| 5,136,954 | 8/1992 | Fetaz et al. . |
| 5,271,343 | 12/1993 | House . |

OTHER PUBLICATIONS

Article in Mar., 1992, Issue of Cotton Farming Magazine, entitled "Precision Placement of In–Furrow Insecticide Reduces Cost", by Horace Tipton, Contributing Editor.

*Primary Examiner*—Henry E. Raduazo
*Assistant Examiner*—Spencer K. Warnick, IV
*Attorney, Agent, or Firm*—John M. Harrison

[57] ABSTRACT

A tube alignment spacer bracket for mounting on a tube alignment bracket which is, in turn, mounted on or shaped integrally with the seed distribution tube of a seed planter, to align the planter insecticide tube or tubes in close proximity to, and in a vertical plane with, the discharge opening of the seed distribution tube and insure that liquid insecticide or fungicide dispensed through the insecticide tube or tubes is deposited in a furrow in close proximity to seeds expelled from the seed distribution tube. In a preferred embodiment the tube alignment spacer bracket is characterized by a Z-shaped bracket having a pair of slots, one of which receives one end of a tube alignment bracket fitted with a tube mount and the opposite slot of which receives one or more tube fittings, to which are attached one or more insecticide tubes. The tube alignment spacer bracket is oriented to position the insecticide tube or tubes in close, fixed proximity with respect to the discharge opening of the seed distribution tube.

20 Claims, 1 Drawing Sheet

U.S. Patent      Feb. 13, 1996      5,490,470
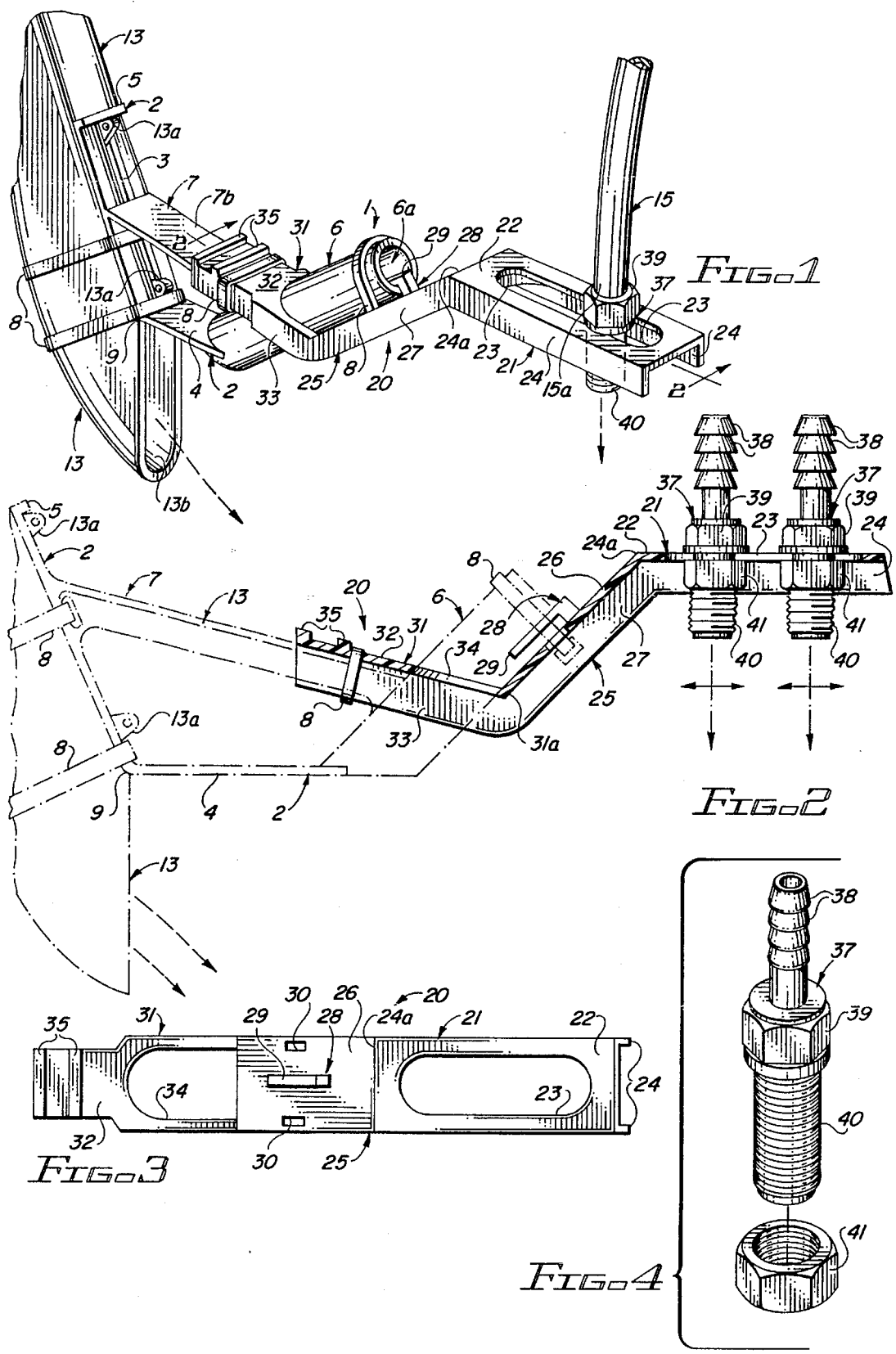

TUBE ALIGNMENT SPACER BRACKET

CROSS-REFERENCE TO RELATED APPLICATION

This application is a continuation-in-part of my U.S. patent application Ser. No. 08/150,723, filed Nov. 12, 1993, entitled "Dual Tube Alignment Bracket" and now abandoned.

BACKGROUND OF THE INVENTION

Field of the Invention

Proper in-furrow insecticide/fungicide and seed placement is an important problem which faces growers during the planting season. The problem includes application of toxic systemic insecticides and/or fungicites in close proximity to seeds as the seeds are expelled in spaced relationship in furrows created by the seed planter, to minimize attach by organisms such as thrips. Proper placement of the insecticide/fungicide directly in the furrows is crucial to avoid environmental damage, and effective location with respect to the seeds helps to avoid seed damage and positions the insecticide/fungicide in a position such that young emerging roots of the germinated seed are able to contact the treatment material, pick it up and translocate it. When the insecticide/fungicide is spaced too far from the seeds, the emerging roots are able to pick up less of the material, resulting in inadequate protection for the growing plant. It is accepted by experts in the agricultural field that either the tap root or the feeder roots springing from the germinating seeds must be in the insecticide/fungicide material to effect optimum protection of the plant.

It has also been found that streaking insecticide or fungicide in the field is environmentally abusive and a waste of money, since many of the insecticide/fungicide materials are toxic and expensive, making proper placement of the insecticide/fungicide in the furrows with respect to the seed at each seed deposition highly important. Improper seed insecticide/fungicide placement results in the requirement of additional expensive folier application and increases the expense of the crop, as well as the risk to the environment.

Conventional planting devices are fitted with both seed distribution tubes and insecticide tubes, the seed distribution tubes being used to uniformly deposit seeds in spaced relationship in furrows created by the planter and the insecticide tubes utilized to distribute insecticide and/or fungicide in the furrows in close proximity to each seed before the seed and insecticide/fungicide are covered with earth by the planter. In a typical application, the seed and insecticide/fungicide are sufficiently spaced to optimize the desired protective effects of the insecticide/fungicide on the seeds and the plants emerging from the seeds. However, far too often the insecticide/fungicide is not accurately delivered to the furrows and may be spilled randomly in the earth adjacent to the furrows, where it presents a danger to the environment and fails to properly treat the germinating seeds.

DESCRIPTION OF THE PRIOR ART

An article entitled "Precision Placement of In-Furrow Insecticide Reduces Costs" in the "Cotton Farming" magazine, 35th Anniversary Issue, dated March, 1992, describes a pipe welded to the bracket that holds the insecticide granule tube of a planter, to extend the insecticide tube and facilitate deposition of insecticide granules closer to the ground near the bottom of the furrows. Various other attachments are known in the art for use with seed planters in applying fertilizer and the like in furrows during planting. U.S. Pat. No. 2,903,982, dated Sep. 15, 1959, to D. W. Floy, details a "Liquid Fertilizer Attachment for a Corn Planter". The attachment includes a jet-pipe attached to a supply hose, which is, in turn, connected to a tank containing liquid fertilizer. The pipe is then projected through or into a corn planter runner and is adapted to apply a stream of liquid fertilizer simultaneously with planting of the corn. U.S. Pat. No. 2,968,266, dated Jan. 17, 1961, to A. W. Gastafson, details an "Apparatus for Treating Soil during Planting". The device includes equipment which is mounted on a conventional planting apparatus such that one device for mixing the chemicals may serve multiple rows by using planting apparatus and equipment driven by the power takeoff of a tractor. The planting apparatus forms a part of the equipment for mixing the chemicals with the soil. U.S. Pat. No. 2,990,186, dated Jun. 27, 1961, to E. S. Gandrud, details a "Device for Spreading Granular Material". The device includes a distributor head having vertically-disposed front and rear walls and downwardly-diverging sidewalls and defining an inlet opening in its upper end and an open bottom for discharging material. A baffle structure in the head between the inlet opening and the open bottom includes multiple baffle sections, wherein one of the generally vertical walls may be quickly and easily removed for easy access to the baffle section for adjustment and cleaning. The device is designed to spread granular material in multiple rows over planted seeds in a field. A "Tube Connector" is detailed in U.S. Pat. No. 3,120,965, dated Feb. 11, 1964, to J. A. MacDonald. The tube connector is characterized by a connector device wherein a first tube can be connected to a second tube at any convenient level along the length of the ladder and at any point on the circumference, at that level. U.S. Pat. No. 3,399,638, dated Sep. 3, 1968, to J. E. Waldrum, et al, details an "Agricultural Spray Device". Disclosed is a low volume agricultural liquid spray device which includes a reservoir for the liquid to be sprayed and a feed mechanism to deliver the liquid under constant head to a spindle having a bore which defines a flow path. A spray device depends from the spindle and a drive system operates to rotate the spindle at a predetermined rate about its axis, wherein the spray device also rotates at the predetermined rate to dispense low volumes of agricultural liquid in a uniform, relatively coarse spray. U.S. Pat. No. 4,276,836, dated Jul. 7, 1981, to W. H. Pust, details a "Grain Drill Utilizing A Fertilizer Spout and Adjustable Deflector Therefor". The grain drill includes a furrow opener, a forwardly-disposed seed distribution spout, a rearwardly-disposed fertilizer spout and a deflector plate positioned beneath the fertilizer spout, so that a desired quantity of the fertilizer discharged from the lower end of the fertilizer spout is deflected laterally. The deflector plate is adjustable forwardly and rearwardly with respect to the seed distribution spout, so that the quantity of fertilizer flowing over the forward edge of the deflector plate can be controlled by the position of the forward edge of the deflector plate with respect to the seed distribution spout. A "Liquid Fertilizer Attachment" is detailed in U.S. Pat. No. 4,580,506, dated Apr. 8, 1986, to Matthew W. Fleischer, et al. The device includes a fertilizer knife adapted to be attached to a planter. A housing is adjustably attached to the fertilizer knife and an adjustable mechanism is provided for permitting the knife to be adjusted vertically with respect to the housing, thereby adjusting the effective depth at which the fertilizer, in liquid form, will be released. The fertilizer knife is attached to the housing, wherein the fertilizer knife will accurately track in front of the line into which the seeds are being planted and this pivoting feature also permits the fertilizer knife to be deflected to one side or the other temporarily, when rocks or other potentially damaging obstructions are encountered. The fertilizer knife has a leading edge extending from a point in close proximity to a vertical pivotal axis and tapers downwardly and rearwardly from that axis. Other patents which are pertinent to the subject of this application are as follows: U.S. Pat. Nos. 1,906,351 dated May 2, 1933; 1,905,767, dated Apr. 25, 1933; 3,891,332, dated Jun. 24, 1975; 1,921,886, dated Aug. 8, 1933; 2,623,483, dated Dec. 30, 1952; 2,861,527, dated Nov. 25, 1958; 3,888,446, dated Jun. 10, 1975; 4,424,757, dated Jan. 10, 1984; 4,608,794, dated Sep. 2, 1986; 5,025, 736, dated Jun. 25, 1991; 5,033,398, dated Jul. 23, 1991; 4,388,878, dated Jun. 21, 1983; and 5,136,954, dated Aug. 11, 1992. My U.S. Pat. No. 5,271,343, issued Dec. 21, 1993, details a "Planter Insecticide Tube Alignment Bracket", upon which the tube alignment spacer bracket described in this application is mounted.

It is an object of this invention to provide a new and improved tube alignment spacer bracket which mounts on a tube alignment bracket for aligning the insecticide/fungicide tube or tubes of a planter with the planter seed distribution tubes to facilitate application of insecticide or fungicide in close proximity to the seeds as the seeds are sequentially deposited in furrows created by the planter.

Another object of this invention is to provide a new and improved tube alignment spacer bracket for mounting on or extending integrally from each of the respective tube alignment brackets provided on the seed distribution tubes of a seed planter, accepting the discharge ends of the insecticide tube or tubes by means of tube fittings and linearly aligning the insecticide tube(s) in close proximity to the discharge ends of the corresponding seed distribution tubes along the respective furrows to insure application of liquid insecticide/ fungicide from the insecticide tubes in the furrows in close, yet controlled proximity to the seeds as the seeds are deposited in the furrows.

Yet another object of this invention is to provide a plastic or fiberglass tube alignment spacer bracket for attachment to the respective tube alignment brackets extending from the corresponding seed distribution tubes and aligning the discharge ends of the respective pairs of insecticide tubes and seed distribution tubes in a seed planter, which tube alignment spacer bracket includes a Z-shaped bracket plate, one slotted end of which receives and is mounted on a corresponding tube alignment bracket and the opposite slotted end receiving one or more tube fittings which receive and stabilize the respective insecticide tubes and position the discharge ends of the insecticide tubes in close proximity to the discharge ends of the respective seed distribution tubes, for depositing the liquid insecticide or fungicide a furrow in close proximity to the seeds when the seeds are deposited in the same furrow.

SUMMARY OF THE INVENTION

These and other objects of the invention are provided in a new and improved, injection-molded plastic, generally Z-shaped tube alignment spacer bracket for use in seed planters for the purpose of orienting the discharge ends of the planter insecticide tube or tubes in spaced alignment with the corresponding discharge end of the planter seed distribution tube or tubes. In a preferred embodiment the tube alignment spacer bracket is characterized by a generally Z-shaped bracket having a pair of bends, one end of which bracket is provided with a slot for receiving a corresponding tube mount element of a tube alignment bracket mounted on each seed distribution tube and is secured to the tube mount by means of a retainer and one or more tie straps or bands. The opposite end of the bracket plate is also slotted and is fitted with one or a pair of tube fittings for receiving the insecticide tubes, to insure that liquid insecticide or fungicide discharged from the insecticide tubes strikes the seed furrow in close proximity to, and in linear alignment with, seeds discharged in spaced sequence in the furrow from the seed distribution tube. The tube alignment spacer bracket may be secured to the tube mount of the tube alignment bracket by means of a pair of band slots for receiving a tie strap or band and securing the tube alignment spacer bracket to the tube mount. The tube alignment bracket may be shaped integrally with the seed distribution tube or may be secured to the seed distribution tube by means of a tie strap.

BRIEF DESCRIPTION OF THE DRAWING

The invention will be better understood by reference to the accompanying drawing, wherein:

FIG. 1 is a perspective view, partially in section, of a seed distribution tube, tube alignment bracket and the tube alignment spacer bracket of this invention mounted on the tube alignment bracket for aligning and spacing an insecticide tube of a typical conventional seed planter with respect to the seed distribution tube;

FIG. 2 is a sectional view of the tube alignment spacer bracket illustrated in FIG. 1, with the tube alignment bracket and seed distribution tube illustrated in phantom and a pair of tube fittings attached to the tube alignment spacer bracket for receding a pair of insecticide tubes;

FIG. 3 is a top view of an unattached tube alignment spacer bracket illustrated in FIGS. 1 and 2; and FIG. 4 is a perspective view of a typical tube fitting for mounting on one end of the tube alignment spacer bracket for receiving and mounting a respective insecticide tube or tubes.

DESCRIPTION OF THE PREFERRED EMBODIMENTS

Referring initially to FIG. 1 of the drawing, the seed distribution tube 13 of a typical conventional single insecticide tube seed planter (not illustrated) includes an opening disc and support wheel (not illustrated), an insecticide tube 15, attached to the planter frame (not illustrated), with the seed distribution tube 13 extending from the planter frame. The seed planter is typically pulled by a tractor (not illustrated) to create a furrow (not illustrated) for receiving seeds and insecticide.

As further illustrated in FIG. 1 and in phantom in FIG. 2 and as outlined in my U.S. Pat. No. 5,271,343, a tube alignment bracket is designated by reference numeral 1 and is mounted on the conventional seed distribution tube 13 attached to the conventional planter (not illustrated). The tube alignment bracket 1 is characterized by a bracket plate 2 having a bend 9, which defines a tube mount segment 4 and a tubular tube mount 6 extending from the tube mount segment 4. An attachment segment 5 extends from the extending end of the tube mount segment 4 at the bend 9 in the bracket plate 2 and the tube mount segment 4 is fitted with a longitudinal plate slot 3, as illustrated in FIG. 1. The longitudinal plate slot 3 is designed to receive spaced tube nibs 13a, projecting from the seed tube 13 and a pair of pipe or tie straps 8 are looped tightly around the tube mount segment 4 and attachment segment 5 of the bracket plate 2 and the seed tube 13 in spaced relationship, to removably secure the tube alignment bracket 1 on the seed tube 13. A T-brace 7 spans the bend 9 in the bracket plate 2 and connects the tube mount segment 4 to the attachment segment 5, for strengthening purposes. The T-brace 7 may be molded integrally with the bracket plate 2, as described above. Accordingly, the entire tube alignment bracket 1 upon which the tube alignment spacer bracket of this invention is mounted may be injection-molded or otherwise shaped from a suitable plastic material such as polyethylene, polypropylene and most preferably, polyvinylchloride, with the T-brace 7 molded in place. The mount bore 6a of each cylindrical tube mount 6 is designed to receive the discharge ends 15a, respectively, of the conventional pellet-dispensing insecticide tubes 15, which are typically conventionally mounted in pairs on the planter frame of the planter, as described in my U.S. Pat. No. 5,271,343. It will be appreciated that the tube alignment bracket 1 may be integrally shaped with the seed distribution tube 13 instead of mounted thereon, as further detailed in my U.S. Pat. No. 5,271,343. Accordingly, under these circumstances, the tube mount 6 of the tube alignment bracket 1 is automatically positioned as illustrated in FIGS. 1 and 2.

Under circumstances where the seed planter is to be used to plant seeds in conjunction with the application of liquid insecticide or fungicide, a tube alignment spacer bracket 20 of this invention is attached to the tube mount 6 of each respective tube alignment bracket 1, to accommodate the respective insecticide tubes 15, as further illustrated in FIGS. 1 and 2. Accordingly, it will be appreciated that while the tube alignment bracket 1 can be utilized alone to accommodate the respective insecticide tubes 15 which distribute granular fertilizer by insertion of the insecticide tubes 15 in the respective tube mounts 6 as indicated in my U.S. Pat. No. 5,271,343, application of the tube alignment spacer bracket 20 is necessary to receive and mount the insecticide tubes 15 which are used to dispense liquid insecticide or fungicide to the seeds. The tube alignment spacer bracket 20 is shaped generally in the configuration of a horizontal "Z" and includes a straight tube leg 21 having a tube leg plate 22, provided with a plate slot 23 and downwardly-extending tube leg plate flanges 24, for stiffening the tube leg plate 22. A center leg 25 extends from the tube leg 21 at a tube leg bend 24a and includes center leg plate 26 which matches the tube leg plate 22 of the tube leg 21, the center leg plate 26 further provided with downwardly-extending, spaced center leg plate flanges 27, which serve to stiffen the center leg plate 26 in the same manner as the tube leg plate flanges 24. A retainer 28 extends from the center leg plate 26 and includes a retainer leg 29 which engages the barrel of the tube mount 6 as illustrated in FIGS. 1 and 2, when the tube alignment spacer bracket 20 is mounted on the tube mount 6 of the tube alignment bracket 1, as further illustrated in FIG. 1. A tie strap 8 may also be looped around the tube mount 6 and extended through a pair of slots 30 (illustrated in FIG. 3) located in the center leg plate 26, in order to removably secure the tube alignment spacer bracket 20 on the tube mount 6, with the retainer leg 29 of the retainer 28 extending into the mount bore 6a of the tube mount 6 and securely engaging the wall of the tube mount 6. A support leg 31 projects from the center leg 25 at a support leg bend 31a and the angle of the tube leg bend 24a and support leg bend 31a are chosen such that the tube leg 21 is located substantially in the horizontal plane when the center leg 25 and support leg 31 are mounted on the tube mount 6, as the support leg 31 fits over the brace flange 7b of the T-brace 7 in the tube alignment bracket 1, as further illustrated in FIG. 2 of the drawing. A tie strap 8 secures the support leg 31 to the brace flange 7b of the T-brace 7 at a pair of band stays 35. Like the tube leg plate 22 and the center leg plate 26, a support leg plate 32 extends from the support leg bend 31a and support leg flanges 33 project downwardly from these support leg plate 32 to define the support leg 31. The tube mount 6 projects through a tube mount opening 34 in the support leg plate 32, to rest against the tube leg plate 22 of the tube leg 21.

Referring now to FIGS. 1, 2 and 4 of the drawings, one or more tube fittings 37, more particularly disclosed in FIG. 4, each include multiple tube keepers 38 for receiving an insecticide tube 15 and a nut collar 39, which includes multiple threads 40 extending therefrom which receive a lock nut 41. The threads 40 project through the plate slot 23 in the tube leg plate 22 of the tube leg 21 and the lock nut 41 threads on the threads 40 to removably secure the tube fitting 37 in position on the tube leg plate 22. Accordingly, an insecticide tube 15 can then be attached to each of the tube keepers 38 on the tube fittings 37, as illustrated in FIG. 1.

Referring again to FIG. 2 of the drawing, in a preferred embodiment of the invention a pair of tube fittings 37 are mounted in the plate slot 23 to accommodate a pair of insecticide tubes 15, as necessary. However, under ordinary circumstances, a single insecticide tube 15 will be required to distribute the insecticide or fungicide to the seed furrows and a corresponding single tube fitting 37 is attached to the tube leg 21 of the tube alignment spacer bracket 20, as illustrated in FIG. 1.

In operation, referring again to FIGS. 1 and 2 of the drawing, the planter (not illustrated) operates to initially open a furrow (not illustrated) in conventional manner by means of an opening disc (not illustrated). The seed distribution tube 13 is then utilized to distribute seeds in a selected spaced sequence into the furrow as indicated by the arrow in FIG. 1, by a suitable seed distribution mechanism in the seed planter which is well known to those skilled in the art. Simultaneously, the insecticide tube or tubes 15, which are secured to the tube fitting(s) 37 mounted on the tube alignment spacer bracket 20, operate to dispense liquid insecticide or fungicide in the furrow in close proximity to the seeds, as indicated by the arrows, to insure proper interaction with the roots of the emerging plants as the seeds germinate. Conventional closing wheels (not illustrated) mounted on the planter then close the furrow, covering the seeds and insecticide and effectively planting the seeds.

Whether shaped integrally with, or mounted on the seed discharge tube 13, the tube alignment bracket 1 positions the tube alignment spacer bracket 20 to maintain the tube discharge opening 13b of the seed distribution tube 13 in a common vertical plane with, and spaced a selected distance from, the discharge ends 15a of the insecticide tube or tubes 15, at all times during the planting operation. This function is assured since, referring again to FIG. 1 of the drawing, the tube alignment bracket 1 is mounted on or projects integrally from the seed distribution tube 13 such that the tube leg 21 of the tube alignment spacer bracket 20 is located substantially in a horizontal plane extending from the top of the tube mount 6 over the furrow. This location facilitates continuous deposition of the liquid insecticide or fungicide directly in the furrow in consistently proper proximity to, and alignment with, the seeds, which are dispensed from the lower portion of the tube discharge opening 13b, as the seed planter 10 moves along the furrows.

It will be appreciated by those skilled in the art that while a preferred material of construction for the tube alignment spacer bracket 20 of this invention is a plastic material capable of being injection-molded as heretofore described with respect to the tube alignment bracket 1, other materials such as wood, fiberglass, metal and the like, in non-exclusive particular, may also be used.

While the preferred embodiments of the invention have been described above, it will be recognized and understood that various modifications can be made without departing from the spirit and scope of the invention.

Accordingly, having described my invention with the particularity set forth above, what is claimed is:

1. A tube alignment spacer bracket for mounting on a tube alignment bracket extending from the seed distribution tube of a planter having at least one treatment tube for dispensing treatment liquid in a seed furrow, said tube alignment spacer bracket comprising bracket means carried by the tube alignment bracket and at least one tube fitting provided on said bracket means for receiving the treatment tube and locating the treatment tube in substantially fixed proximity with respect to the seed distribution tube, whereby treatment liquid dispensed from the treatment tube strikes the seed furrow in a selected close proximity to seeds ejected from the seed distribution tube into the seed furrow.

2. The tube alignment spacer bracket of claim 1 wherein said bracket means comprises a plate provided with a pair of bends, said plate defining a support leg connected to the tube alignment bracket, a tube leg carrying said tube fitting and a center leg connecting said support leg to said tube leg at said bends.

3. The tube alignment spacer bracket of claim 1 comprising threads provided on said tube fitting and a nut for engaging said threads and bolting said tube fitting to said bracket means, with said tube fitting oriented on said bracket means in substantially vertical relationship.

4. The tube alignment spacer bracket of claim 1 wherein said bracket means comprises a plate provided with a pair of bends, said plate defining a support leg connected to the tube alignment bracket, a tube leg carrying said tube fitting and a center leg connecting said support leg to said tube leg at one of said bends, and comprising threads provided on said tube fitting and a nut for engaging said threads and bolting said tube fitting to said bracket means, with said tube fitting oriented on said bracket means in substantially vertical relationship.

5. The tube alignment spacer bracket of claim 2 comprising a retainer projecting from said center leg for engaging the tube alignment bracket and comprising a pair of slots provided in said center leg and at least one band means extending through said slots and encircling the tube alignment bracket, for removably mounting said tube alignment spacer bracket on the tube alignment bracket against said retainer.

6. The tube alignment spacer bracket of claim 5 wherein said tube fitting comprises a threaded tube fitting bolted to said bracket means, with said threaded tube fitting positioned in substantially vertical orientation.

7. The tube alignment spacer bracket of claim 5 comprising at least one band stay provided on said support leg for stabilizing said band means on said tube alignment spacer bracket and the tube alignment bracket.

8. The tube alignment spacer bracket of claim 2 comprising a tube mount opening provided in said support leg for receiving the tube alignment bracket and a plate slot provided in said tube leg for receiving said tube fitting, whereby said tube alignment spacer bracket is stabilized on the tube alignment bracket and said tube fittings are stabilized on said tube leg of said tube alignment spacer bracket.

9. The tube alignment spacer bracket of claim 8 wherein said tube fitting comprises a threaded tube fitting bolted to said bracket means, with said threaded tube fitting positioned in substantially vertical orientation.

10. The tube alignment spacer bracket of claim 9 comprising a retainer projecting from said center leg for engaging the tube alignment bracket and a pair of band slots provided in said center leg and at least one band means extending through said band slots and around the tube alignment bracket, for removably securing the tube alignment bracket in said tube mount opening against said retainer.

11. The tube alignment spacer bracket of claim 10 comprising at least one band stay provided on said support leg for stabilizing said band means on said tube alignment spacer bracket and the tube alignment bracket.

12. A tube alignment spacer bracket for mounting on the tube mount of a tube alignment bracket provided on the discharge end of the seed distribution tube of a seed planter and locating an insecticide/fungicide tube carried by the seed planter in a selected fixed proximity with respect to the seed distribution tube, said tube alignment spacer bracket comprising a plate defining a support leg carried by the tube mount of the tube alignment bracket; a center leg extending from said support leg at a first bend; a band extending around said center leg of said tube alignment spacer bracket and the tube mount of the tube alignment bracket for securing said tube alignment spacer bracket on the tube mount; a tube leg extending from said center leg at a second bend; and at least one tube fitting carried by said tube leg for receiving the insecticide/fungicide tube, whereby the insecticide/fungicide tube is located in said selected fixed proximity with respect to the discharge end of the seed distribution tube.

13. The tube alignment spacer bracket of claim 12 comprising a retainer projecting from said center leg for engaging the tube mount and stabilizing said tube alignment spacer bracket on the tube mount.

14. The tube alignment spacer bracket of claim 12 comprising a pair of longitudinal plate slots provided in said center leg in spaced relationship with respect to each other for receiving said band.

15. The tube alignment spacer bracket of claim 12 comprising:

(a) a retainer projecting from said center leg for engaging the tube mount and stabilizing said tube alignment spacer bracket on the tube mount; and (b) a pair of longitudinal plate slots provided in said center leg in spaced relationship with respect to each other for receiving said band.

16. The tube alignment spacer bracket of claim 12 wherein said tube fitting comprises a threaded tube fitting bolted to said tube leg, with said threaded tube fitting positioned in substantially vertical orientation.

17. The tube alignment spacer bracket of claim 12 comprising at least one band stay provided on said support leg for stabilizing said band on said center leg of said tube alignment spacer bracket and the tube mount of the alignment bracket.

18. The tube alignment spacer bracket of claim 17 comprising:

(a) a retainer projecting from said center leg for engaging the tube mount and stabilizing said tube alignment spacer bracket on the tube mount; and (b) a pair of longitudinal plate slots provided in said center leg in spaced relationship with respect to each other for receiving said band.

19. A tube alignment spacer bracket for mounting on the tube mount of a tube alignment bracket provided on the discharge end of the seed distribution tube of a seed planter and locating an insecticide/fungicide tube carried by the seed planter in a selected fixed proximity with respect to the seed distribution tube, said tube alignment spacer bracket comprising a generally Z-shaped plate defining a support leg receiving the tube mount of the tube alignment bracket; a center leg extending from said support leg at a first bend; a band extending around said center leg of said tube alignment spacer bracket and the tube mount of the tube alignment bracket for securing said tube alignment spacer bracket on the tube mount; and a tube leg extending from said center leg at a second bend for receiving the insecticide/fungicide tube, whereby the insecticide/fungicide tube is located in said selected fixed proximity with respect to the discharge end of the seed distribution tube.

20. The tube alignment spacer bracket of claim 19 comprising at least one tube fitting carried by said tube leg for receiving and mounting the insecticide/fungicide tube.

* * * * *